United States Patent

Kamlukin

[11] 3,951,223
[45] Apr. 20, 1976

[54] TRACTOR VEHICLE STRUCTURAL ARRANGEMENT THAT MINIMIZES VIBRATION
[75] Inventor: Igor Kamlukin, Mequon, Wis.
[73] Assignee: Briggs & Stratton Corporation, Wauwatosa, Wis.
[22] Filed: Aug. 20, 1974
[21] Appl. No.: 499,085

[52] U.S. Cl. .................. 180/11; 180/1 F; 180/53 R; 180/54 D; 180/64 M; 280/87 R; 248/8; 280/111
[51] Int. Cl.² ........................................ B60K 5/10
[58] Field of Search ........... 180/11, 12, 33 A, 54 D, 180/53 R, 1 F, 64 M; 280/150 F, 87 R, 111; 248/9, 6, 7, 8

[56] References Cited
UNITED STATES PATENTS

| | | | |
|---|---|---|---|
| 3,187,821 | 6/1965 | Kamlukin | 180/53 R |
| 3,198,276 | 8/1965 | Gordon | 180/11 |
| 3,319,731 | 5/1967 | Kenkel | 180/53 R |
| 3,429,533 | 2/1969 | Harkness | 248/9 |
| 3,473,620 | 10/1969 | Müller et al. | 180/11 |
| 3,483,938 | 12/1969 | Enters | 180/53 |
| 3,700,256 | 10/1972 | Jones | 280/150 F |
| 3,777,837 | 12/1973 | Harper | 180/11 X |
| 3,841,425 | 10/1974 | Harkness | 180/53 R |
| 3,841,426 | 10/1974 | Nemschoff | 248/3 X |
| R20,171 | 11/1936 | Curtiss | 180/11 |

Primary Examiner—M. H. Wood, Jr.
Assistant Examiner—John P. Silverstrim

[57] ABSTRACT

In a tractor having front and rear pairs of wheels and an engine mounted over one of said pairs of wheels, the engine, said one pair of wheels, and implement hitch fittings comprise one module. The rest of the vehicle, including an operator's seat and steering wheel, comprises another module, connected with the first module by resilient vibration absorbing elements. In the first module the engine is rigidly mounted on a subframe to which the resilient elements are connected. The subframe and an axle for said pair of wheels can tilt relative to one another about a fore-and-aft extending axis, but such tilting is frictionally retarded to dampen vibratory engine movements about said axis.

9 Claims, 5 Drawing Figures

TRACTOR VEHICLE STRUCTURAL ARRANGEMENT THAT MINIMIZES VIBRATION

This invention relates generally to tractor vehicles powered by internal combustion engines; and while the invention, in one sense, concerns the mounting of an engine in a tractor, it is more broadly concerned with means for minimizing transmission of vibration from the engine of such a vehicle, and also from an implement driven and propelled by the same engine, to portions of the vehicle that are contacted by its operator.

Single-cylinder engines such as are used for powering yard and garden tractors and similar machines have an inherent tendency to generate a certain amount of vibration. When such an engine is rigidly mounted on a riding tractor, the vibration of the engine is transmitted to the operator through the parts of the machine that he contacts, such as the seat, footrests and steering gear. The vibration is annoying to the operator, and after a more or less prolonged period of operation it can cause noticable fatigue and discomfort. Vibration of the machine is also undesirable because it loosens nuts and bolts, promotes frictional wear of contiguous parts that can slide or rub on one another, and causes mechanical troubles and failures in other familiar ways.

It is also known — although perhaps not fully appreciated until recently — that the vibration of the machine itself is responsible for generation of a certain amount of noise that is due to engine vibration; which is to say that the machine, in being permitted to vibrate, tends to make engine vibration audible.

Because generation of vibration is to some extent inherent in a single cylinder engine, larger engines tend to generate higher amplitude vibrations than smaller ones. In recent years there has been a tendency to use relatively large engines for powering lawn and garden tractors, in order to obtain increased efficiency and utility in such machines; and consequently increasing attention has had to be given to their vibration problems.

Attempts have been made to reduce vibration at its source by means of ingenious counter-balancing arrangements within the engine itself. Some of these have been quite successful in reducing vibration, but not in completely eliminating the vibration with which this invention is concerned.

Further improvement with a view to reducing the vibration problem seems to lie in the direction of the so-called soft mounting of the engine, whereby the engine is permitted to have yieldingly restrained freedom for motion relative to other parts of the machine, so that vibration is in effect confined to the engine and isolated from the rest of the machine.

To accomplish a high degree of vibration isolation of an internal combustion engine (paraticularly a one-cylinder four-cycle engine) from the tractor frame, very soft mounts are required, because very low frequency vibration must be isolated. But soft mounts allow the engine to oscillate through high amplitudes and, at times, very violently, due to excitation of the torque impulse during the firing cycle of the engine when full power is required. This violent oscillation of the engine creates drive line problems, particularly in the most favored belt-type transmissions which have the attributes of simplicity, flexibility, low cost and quiet operation.

For a belt transmission to be efficient, its driving and driven pulleys must be maintained in fixed spacial relationship. But if the engine is permitted to have bodily vibratory motion relative to other parts of the machine, the required fixed relationship between the driving and driven pulleys of the transmission will not be attained unless the oscillations of the engine are kept from producing corresponding relative motion between the driving and driven pulleys.

With that objective in mind, certain soft mounting arrangements have heretofore been proposed in which the location of the driving pulley on the engine crankshaft was substantially fixed, though the engine as a whole had a limited degree of freedom for vibration-responsive motion about a point located approximately in the pulley. See, for example, the Harkness U.S. Pat. No. 3,429,533 and the allowed application of J. R. Harkness, Ser. No. 410,188, now U.S. Pat. No. 3841425. These arrangements have been successful for smaller engines, but in larger engine installations too much residual vibration was still transmitted.

As with the last mentioned developments, the prior art seems to have consistently held to the idea that the engine must be free for limited vibration-responsive motion relative to all other parts of the machine. One point of departure of the present invention from the prior art is the discard of that long held and generally accepted idea, insofar as it would dictate isolation of the engine from the structure of the tractor upon which the engine is mounted.

Furthermore, the present invention takes account of the fact that a powered implement which is carried by or coupled to a tractor or the like, may in itself generate a certain amount of vibration. Thus, if a rotary mower is connected with a tractor by means of a fairly rigid hitch, and has blades that are out of balance, the mower can generate vibration that may be transmitted into the vehicle through the hitch. Of course, vibration that the operator of a tractor receives from an implement is just as objectionable as vibration that emanates from the engine.

The general object of the present invention, therefore, is to provide a tractor vehicle which is powered by an internal combustion engine and which propels a working unit, such as an implement that is also powered by the engine, wherein vibration of both the engine and the working unit are effectively isolated from other parts of the machine and particularly the parts that are contacted by the operator, and wherein the pulleys of a belt transmission between the engine and the power driven working unit are always located in such relation to one another that the reaction force of belt tension does not pass through the isolation members.

The invention can also be regarded as proceeding from another line of reasoning which is at odds with prior conceptions about what ought to be done about the problem of engine vibration in riding tractors and the like. For any given size engine (displacement), the amplitude of vibration of a free engine has an inverse relationship to the mass of the engine. This is to say that the vibration of a tractor with a rigidly mounted engine will be less noticeable if the engine is heavy rather than light. Increasing the weight of a tractor vehicle is undesirable because of the costs involved.

Heretofore, as pointed out above, the accepted alternative with its attendant problems has been to soft mount the engine itself, so that it vibrated independently of the rest of the machine; but the present invention proceeds from a recognition that there can be important advantages in rigidly mounting the engine of a tractor vehicle on a part or parts of the machine that are not contacted by the operator, and providing a soft mounting connection between that or those parts of the vehicle and the remainder of it. This in effect increases the weight of the engine and, in addition, enables vibration of the engine to be carried into the ground through wheels that are rigidly connected with the part or parts on which the engine is mounted. In this manner, the ground serves to some extent as a part of the exciting mass, damping a substantial portion of its vibration, so that the undamped remainder of the vibration will be of relatively low amplitude and thus will be easier to isolate from the rest of the machine by the soft mounts.

The invention also has as its object the provision of a tractor vehicle of the character described that comprises essentially two modules which are connected by vibration isolating pads or the like, one of said modules comprising, as a substantially rigid unit, the engine that powers the tractor, a pair of wheels over which the engine is located, a rigid connection between the engine and that pair of wheels, and a hitch by which the tractor is connectable with a working unit that it is intended to power and propel; and the other of said modules comprising the rest of the tractor, including those parts of it that are normallly contacted by the operator.

It will be apparent from what has just been said that it is also an object of this invention ro provide a tractor vehicle wherein an engine that powers the tractor is connected in substantially rigid relation to a pair of wheels over which the engine is mounted and to an implement hitch, so that even though the engine is free for a certain amount of vibratory motion relative to other parts of the tractor, an implement connected to the hitch can be efficiently driven from the engine through a belt transmission, owing to the fixed relationship between the engine and the implement.

Another specific object of the invention, particularly achieved in certain embodiments of the invention, is to provide a tractor wherein vibrations of the engine and of an engine driven implement hitched to the tractor are isolated from other parts of the tractor by reason of a mounting arrangement having the features set forth above, and wherein engine vibration is isolated by so mounting the engine that it is free for dampingly limited vibration-responsive motion relative to the wheels over which it is mounted and relative to an implement hitched to the tractor, such relative motion being confined, however, to tilting or rocking of the engine about a single axis that is parallel to and near the crankshaft axis of the engine, so that such rocking of the engine does not interfere with belt transmission of engine power but does serve to isolate a predominant mode of engine vibration.

It is a further object of this invention to provide a tractor vehicle by which a working unit can be propelled and which has a front pair of wheels and a rear pair of wheels, and has its engine mounted over one of said pairs of wheels, and wherein an axle member that has the wheels of said one pair on its opposite ends is mounted for swinging motion about an axis which is located midway between the wheels and which extends lengthwise of the vehicle, to enable all of the wheels to maintain contact with irregular terrain and, concomitantly, to provide for dampingly absorbing engine vibration of one mode.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which.

Referring now to the accompanying drawings, the numeral 5 designates generally a tractor vehicle which embodies the principles of this invention and which is powered by a single-cylinder engine 6. The vehicle has a pair of front wheels 7 and a pair of rear wheels 8, and in each of the herein illustrated embodiments of the invention the rear wheels 8 are driven by the engine for vehicle propulsion while the front wheels 7 are steerable. In the embodiments of the invention illustrated in FIGS. 1 through 4, the engine 6 is mounted over the front wheels; in the other illustrated embodiment it is mounted over the rear wheels. It will become apparent as the description proceeds that the principles of the invention are applicable to any arrangement of engine and wheels, so long as the engine is mounted substantially over one of the pairs of wheels.

The tractor vehicle 5 is intended to propel a working unit 9, which could be a trailer or an implement of any type, hitched to the vehicle in any suitable manner. The working unit is here illustrated in each case as a rotary lawn mower that is intended to be powered by the engine 6 and is mounted between the two pairs of wheels of the tractor. As is more or less conventional, the lawn mower 9 is wholly or partially supported from the tractor vehicle as described hereinafter.

To accommodate an operator who steers and controls the tractor, it is equipped with a seat 11 located generally over the rear wheels, a steering wheel 12 and footrests 13, as well as conventional instrumentalities (not shown, but in the nature of throttle and clutch levers and the like) by which an operator can control the engine, the propulsion of the vehicle, and the operation of an implement hitched to it.

The engine 6 can be mounted with the axis of its crankshaft 14 oriented in any desired direction.

In general a tractor vehicle according to the present invention comprises two modules or main subassemblies 15 and 16 that are connected with one another only by means of resilient vibration isolating mounting elements or pads 17. One subassembly or module 15, which can be designated the engine module, comprises the engine 6, a subframe 18 upon which the engine is rigidly mounted, the pair of wheels 7 or 8 over which the engine is mounted, and structure which connects that pair of wheels with the subframe. The other module 16, which can be considered the main module, comprises the remainder of the vehicle, including its main frame 19, its other pair of wheels, and the parts 11, 12, 13 of the vehicle that are normally contacted by its operator. In most cases the module 16 will constitute the greater part of the vehicle from the standpoint of mass, and consequently any vibration forces that may be transmitted into it through the vibration isolators 17 will not impart to it a vibration of large amplitude.

Obviously there could be any desired number of mounting pads 17, so long as there were at least three of them to provide a stable connection between the modules; but the mounting pads should in any case be so located as to be arranged substantially symmetrically to the longitudinal center line of the vehicle. Each of the mounting pads can be of a commercially available type, comprising a biscuit-like body 20 of elastomer (rubber or the like) with suitable stud-like mounting elements 21 projecting from opposite sides.

In each of the embodiments of the invention illustrated in FIGS. 1–4, the engine is mounted over the front wheels 7 and is free for damped and limited tilting or swinging motion relative to those wheels, but such motion is permitted about only one axis — which in each case extends lengthwise of the vehicle — and the connection between the engine and the front wheels is otherwise rigid.

In the front engine vehicle illustrated in FIGS. 1–4, the engine is rigidly mounted upon a subframe 18 that is rectangular and of a length and width to fit with substantial clearance within a more or less U-shaped front end portion 28 of the main frame 19 of the vehicle. Four isolator elements 17 are connected between the subframe and the main frame, one near each corner of the subframe.

Again, there can be any number of mounting pads 17 so long as there are at least three, but with respect to the particular embodiments of the invention illustrated in FIGS. 1–4, one other consideration deserves attention. In each instance the line of support that is provided by the front wheels 7 at their contacts with the ground is located a distance ahead of the center of gravity of the engine 6 and near the front pair of mounting pads. It will be apparent that the engine module therefore tends to be fulcrumed for swinging about the rear pair of mounting pads. This relationship suggests that, desirably, the front pads should be somewhat stiffer than the rear ones, or that one additional mounting pad might be mounted at the front of the subframe, located on the vertical plane of symmetry of the vehicle. It has been found, however, that even when there are four pads, arranged as illustrated and all identical with one another in stiffness, very satisfactory results are obtained, inasmuch as vibration of the driver accommodating parts of the tractor is reduced to less than half of what it would be in a comparable tractor with its engine rigidly mounted on its main frame, and such vibration reduction is obtained at all engine speeds.

The wheels of a tractor vehicle must be permitted to have such up and down motion relative to one another as will insure that all four of them will always be in contact with the ground, notwithstanding terrain irregularities. To this end the front wheels 7 are mounted on a front axle member 29 which is so connected with the subframe 18 as to be tiltable relative thereto about an axis which extends lengthwise of the tractor and which is located midway between its wheels.

Figure 2:
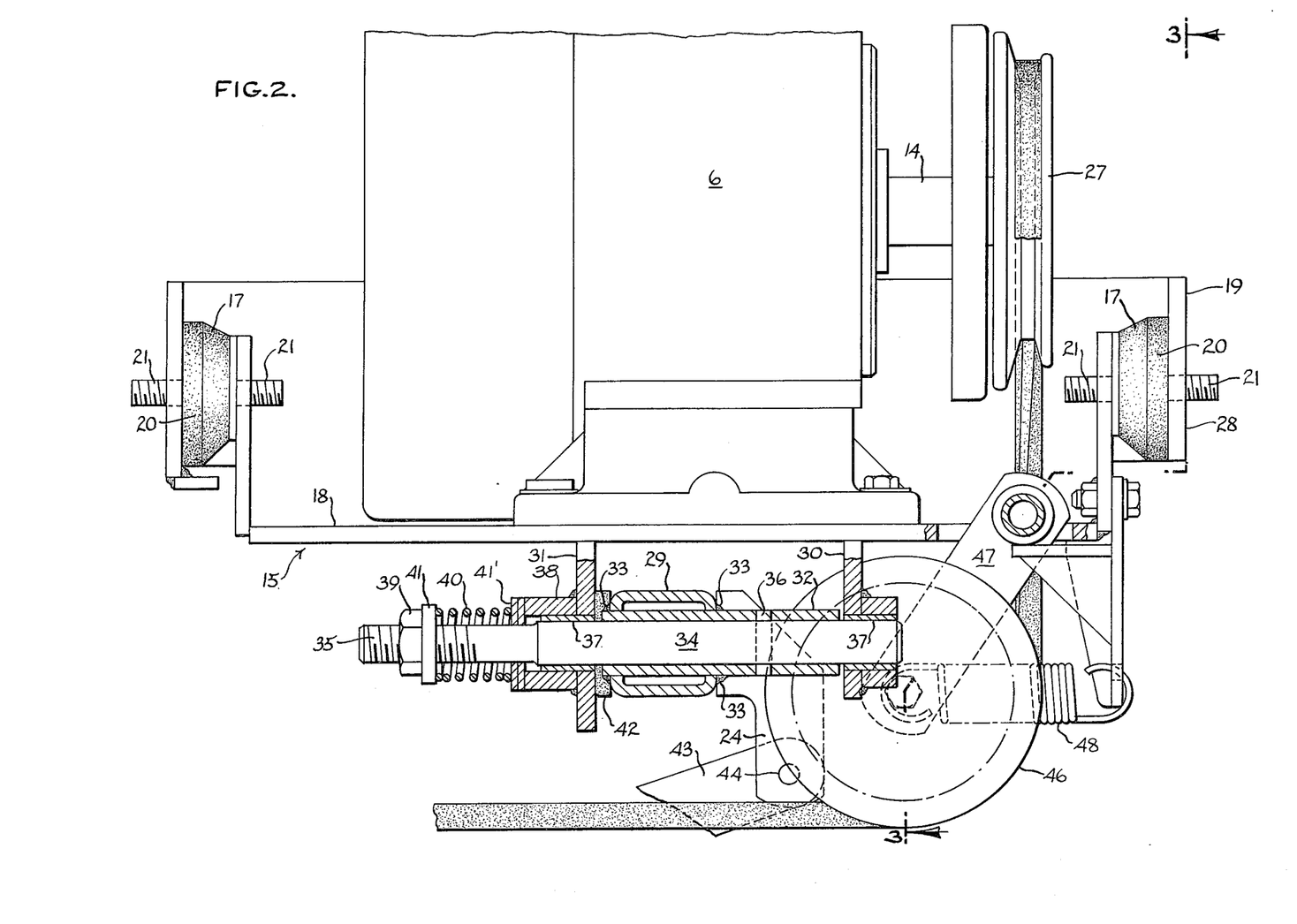
FIG. 2 is a fragmentary longitudinal sectional view, on a larger scale, of that portion of the tractor vehicle shown in FIG. 1 that comprises the connection between its engine subframe and its front axle.
Figure 3:
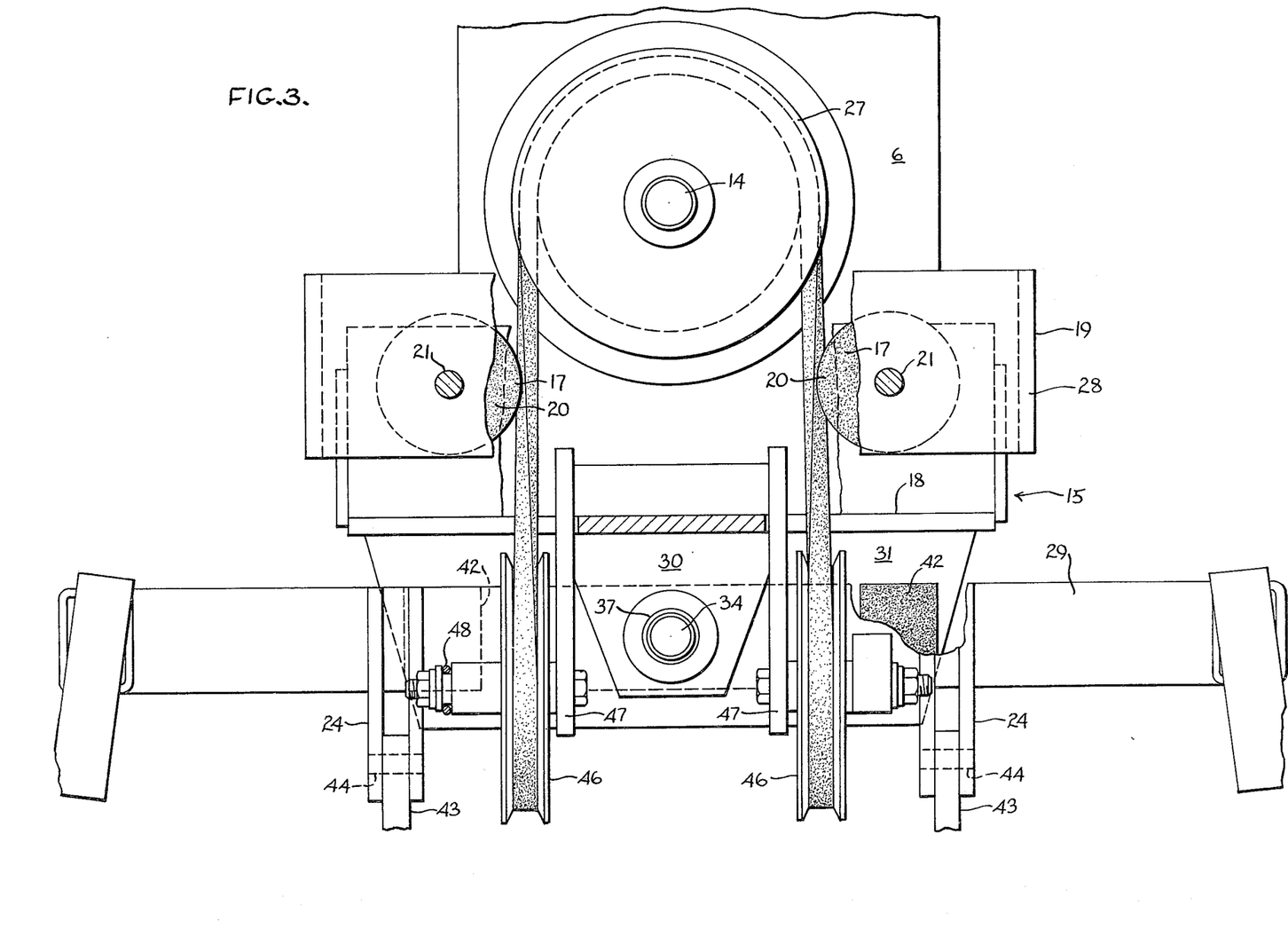
FIG. 3 is a sectional view taken on the plane of the line 3—3 in FIG. 2.

The structure that provides for such tilting of the front axle, and also provides for frictional retardation of its tilting movements, is illustrated in FIGS. 2 and 3. Welded to the underside of the subframe are front and rear downwardly projecting legs or brackets 30 and 31, spaced from one another by a substantial distance in the fore-and-aft direction of the vehicle and each extending most of the distance across the subframe. Diagonal braces (not shown) can be connected between the bottoms of the brackets and the underside of the subframe to hold the brackets rigid. The front axle member 29 comprises a tube of more or less rectangular cross section. A fore-and-aft extending sleeve 32, somewhat shorter than the distance between the brackets 30 and 31, passes through the center of the axle member. Extending through the sleeve 32 and through coaxial holes in the two brackets is a trunnion shaft 34 which has a threaded rear end portion 35 that projects a distance behind the rear bracket 31. The sleeve is bonded to the axle member by means of weldments 33, and the shaft is in turn constrained to move in unison with the sleeve by means of a pin 36 that extends transversely through them. By reason of the connection provided by the pin 36, the sleeve 32 constitutes in effect an enlarged diameter medial portion of the shaft 34, to which the axle member 29 is welded; and the shaft itself provides a trunnion on which the axle member tilts. To minimize wear due to rotation of the shaft, the holes in the brackets can be provided with bushings 37 in which the shaft is journaled.

Fixed on the rear bracket is a tubular spring seat member 38 that concentrically surrounds the bushing 37 on that bracket and projects a distance behind it. A nut 39 is threaded onto the rear end of the shaft 34, and a rather stiff compression spring 40, piloted on the rear portion of the shaft, reacts between washers 41 that engage the nut 39 and the spring seat member 38, respectively. It will be apparent that the damper spring 40 biases the axle member bodily rearwardly with a force that depends upon the position of adjustment of the nut 39. By reason of such rearward biasing force upon the axle, friction pads 42 that are fixed to it, spaced to opposite sides of the shaft 34, are maintained in friction producing engagement with the flat front face of the rear bracket 31. The friction pads can be of nylon or the like.

The friction developed by the pads 42 is not great enough to interfere with tilting of the axle in response to terrain irregularities, but it does have an important function in damping a predominant mode of engine vibration, which results from torsional reaction of the engine to its power strokes. The relatively abrupt and cyclically recurrent forces that generate vibration of this mode are of course exerted around the crankshaft axis. If, as shown, the engine has its crankshaft axis parallel to and relatively near the axis of the pivotal connection comprising the shaft 34, the engine is free to rock about that connection to the extent that it is permitted to do so by the resilience of the mounting pads 17 and the friction due to the friction pads 42. The motion energy of such rocking movement is dissipated in friction. As a result, those motion forces are carried into the ground and the rest of the tractor experiences a more or less steady, uniform reaction force.

While the engine can move only about a fore-and-aft extending axis, and is therefore in rigid relation to the remainder of its module 15 with respect to motion vertically and in fore-and-aft directions, the vibrations of the engine in the directions of such rigidity are of smaller amplitude and are readily absorbed and isolated by the soft mounting pads.

The attachment fittings 24 for an implement to be propelled by the vehicle are shown fixed on the front axle, spaced to opposite sides of the shaft 34, so that the implement can tilt with the axis and thus accommodate itself to terrain irregularities. As is conventional, the implement 9 has at its front rigid forwardly and upwardly projecting hitch brackets 43 that are readily removably connected with the attachment fittings 24 by means of coaxial hitch pins 44, and the rear of the implement has rollers 45 that ride on the ground.

Obviously the attachment fittings 24 could be fixed on the underside of the subframe itself instead of on the axle.

Figure 1:
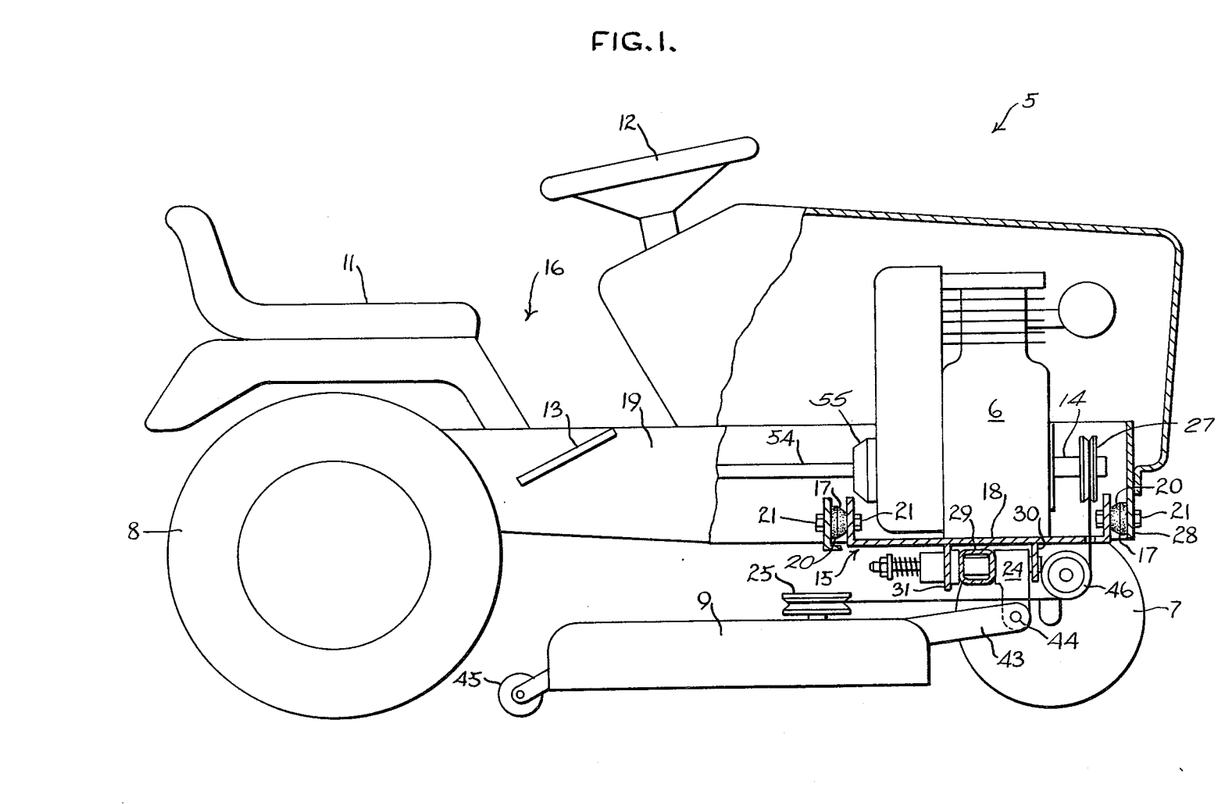
FIG. 1 is a more or less diagrammatic side view of a tractor vehicle which embodies the present invention and which has a front mounted engine, rear wheel propulsion, and a belt transmission connecting its engine with an implement hitched to its front axle.

In either case, a belt transmission between a driving pulley 27 on the engine crankshaft and a driven pulley 25 on the mower can be readily so arranged that engine vibration does not affect belt tension. The belt transmission must, however, accommodate up and down terrain following movements of the implement relative to the vehicle. To that end the belt 26 is trained around a pair of idler pulleys 46, each of which guides one of the belt stretches downwardly from the driving pulley and thence rearwardly to the driven pulley. Each idler pulley is carried on the lower end of a downwardly projecting arm 47 that is so connected to the subframe at its upper end as to be constrained to fore-and-aft swinging motion. A tension spring 48 reacts between the lower end of each arm 47 and a fixed, downwardly projecting bracket on the subframe, so that the idler pulleys are thus urged forwardly to maintain tension of the belt as the implement moves up and down.

Figure 4:
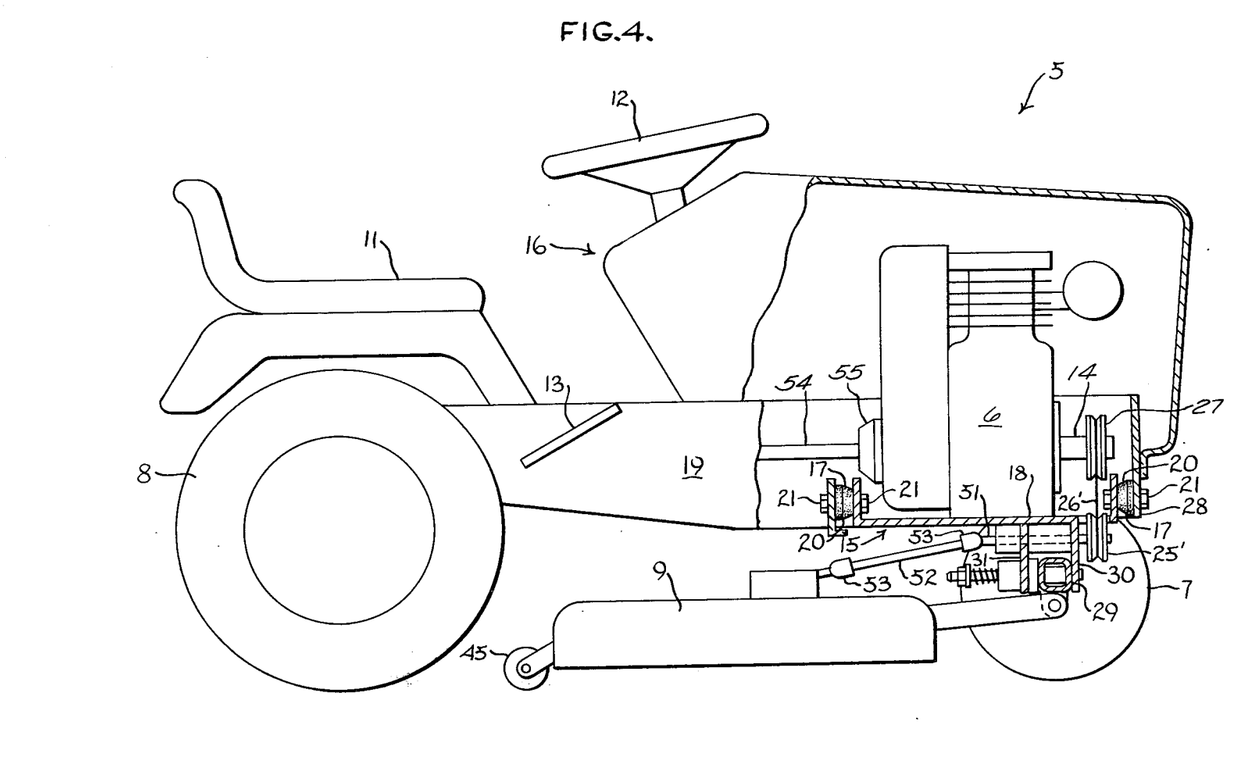
FIG. 4 is a view generally similar to FIG. 1 but illustrating an embodiment of the invention in which the power transmission between the engine and an implement propelled by the vehicle comprises a power take-off shaft.

In the arrangement illustrated in FIG. 4, there is a fore-and-aft extending power takeoff shaft 51 which is rotatably journaled in the brackets 30 and 31 that carry the pivotal connection between the subframe and the front axle, just above that connection. A driven pulley 25' on the front end of the shaft 51 has a belt connection 26' with a driving pulley 27 on the engine crankshaft, and since the axis of the power takeoff shaft is very close to the axis about which the engine swings in its vibration produced excursions, engine vibration cannot bring about any substantial change in belt tension. An implement drive shaft 52, having conventional splined universal joint couplings 53 at its opposite ends, has a readily detachable driving connection with the rear end of the power takeoff shaft and transmits power from it to the drive mechanism of the implement.

In each of the front engine embodiments of the invention, a propulsion drive shaft 54, through which power is transmitted from the engine to the rear wheels, has its front end connected with the projecting rear end portion of the crankshaft by means of a flexible coupling 55 of a type that incorporates resilient cushioning to absorb torsional impulses.

It will be apparent that relatively little modification is required to adapt a prior riding tractor structure to the principles of the present invention. The more or less U-shaped front end portion 28 of the main frame of the tractor is generally conventional, and the subframe 18 on which the engine is seated can be of such size as to be received within the embrace of that portion of the main frame, with sufficient space between that frame portion and the subframe to accommodate the mounting pads and to provide clearance for the vibratory motions of the subframe.

Figure 5:
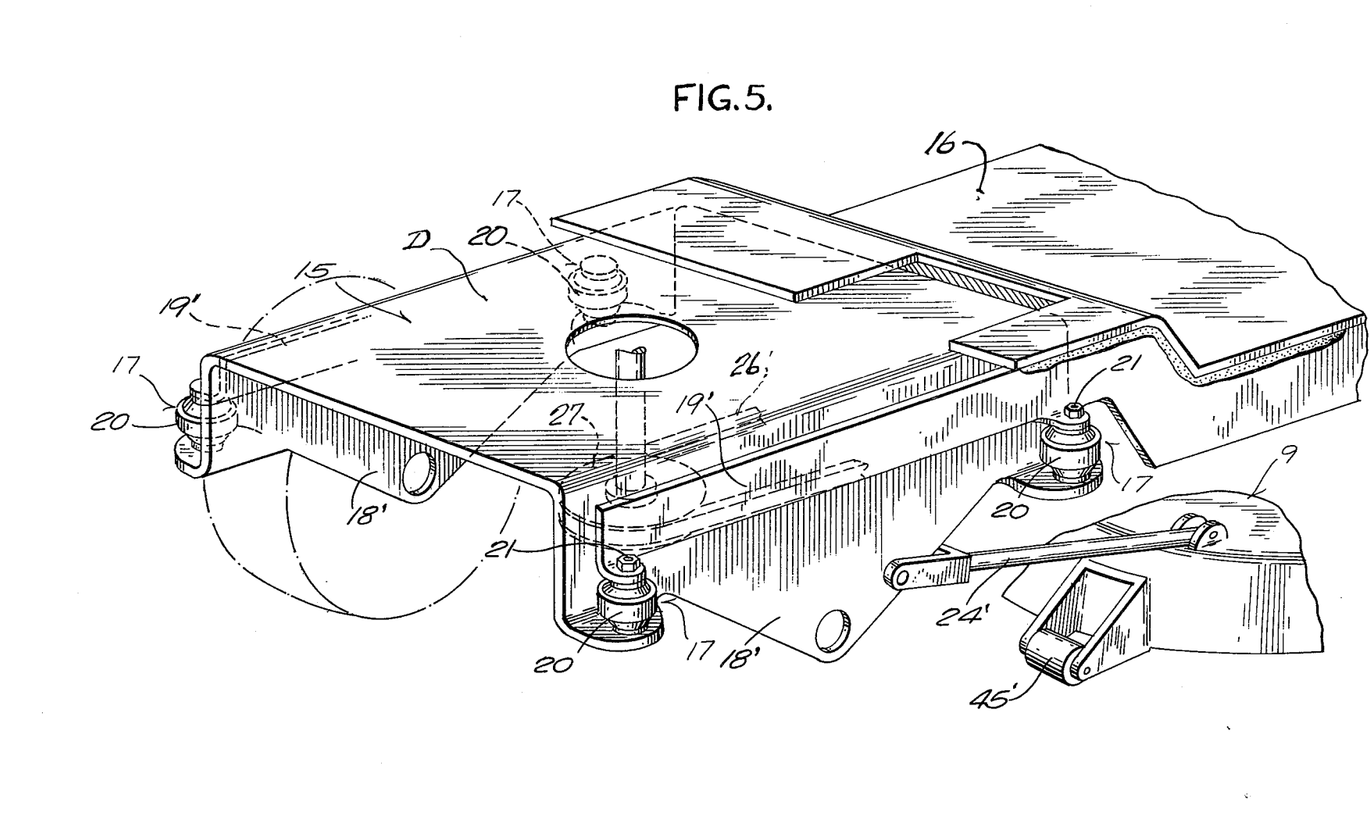
FIG. 5 is a fragmentary perspective view of the rear part of the frame of a tractor vehicle embodying the principles of this invention and which has rear wheel propulsion and has its engine mounted over its rear wheels.

In the embodiment of the invention illustrated in FIG. 5, which illustrates only that much of the structure needed to be shown to portray the adaptability of the invention to a tractor in which the engine is located over the rear wheels, the main frame of the vehicle has a pair of rigid, rearwardly extending legs 19', and the subframe on which the engine is mounted comprises a rectangular inverted U-shaped member that forms a substantially horizontal deck D and has spaced apart side flanges 18' which embrace those legs and are secured to them by means of four vibration isolating elements or mounting pads 17, one near each corner of the deck.

In this case the engine (not shown in FIG. 5) is rigidly fixed to the subframe 18 by being bolted to its deck, so that the engine is not free to make vibratory excursions in any direction relative to the rear wheels. The engine is mounted with its crankshaft oriented vertically. Its power is delivered to the rear wheels through a gear box (not shown) or similar transmission, mounted on the subframe to be in fixed relation to the engine and the axes of the rear wheels.

In the illustrated rear engine embodiment of the invention, the implement attachment fittings comprise a pair of rigid, forwardly extending arms 24' of like length, one at each side of the machine, each having its front end connected to the mower and its rear end connected to the side flanges 18' of the subframe upon which the engine is rigidly mounted. Pivotal connections at both ends of each arm 24' allow the arms to swing up and down, thus accommodating bodily vertical and side-to side tilting movements of the mower relative to the tractor vehicle, whereby the mower can follow irregularities in the terrain. In effect the mower is pushed by the tractor vehicle through the arms 24', and it is supported and stabilized in any conventional manner, as by rollers 45' at its rear and links or chains that nonrigidly suspend its front end from the vehicle main frame, none of which structure is shown in FIG. 5.

Engine power is imparted to the mower through a driven pulley at the top of the mower, rotating on a vertical axis. A belt 26' is trained around the driven pulley and around a driving pulley 27' that is either directly mounted on the engine crankshaft or driven from the engine crankshaft. In any case, the driving pulley 27' is in a fixed location beneath the deck D and substantially in radial alignment with the driven pulley.

The front ends of the arms 24' have the coinciding axes of their pivotal connections to the mower substantially on a transverse line that extends through the axis of the driven pulley, and the pivotal connections between the rear ends of those arms and the subframe side flanges 18' have their coinciding axes substantially intersecting the driving pulley. Hence the driven pulley is always at a fixed distance from the driving pulley, notwithstanding engine vibration and terrain-following movements of the mower, and the belt 26' is maintained under constant tension. Because the arms 24' comprise a part of the engine module 15, the resilient mounting elements 17 isolate from the larger module 16 only only the vibration of the engine but also any vibration generated by the mower or other implement attached to those fittings.

In the rear engine embodiment of the invention illustrated in FIG. 5, wherein the engine is mounted in rigid relation to the axes of the rear wheels, all vibratory movements of the engine, in every direction, are carried into the rear wheels, and therefore the engine crankshaft can be oriented in any desired direction.

From the foregoing description taken with the accompanying drawings, it will be apparent that this invention provides a tractor vehicle wherein both engine vibration and vibration of an implement propelled by the tractor are isolated from those parts of the vehicle that are normally contacted by its operator, and wherein power can be very efficiently taken from the engine through a belt transmission, notwithstanding the fact that the engine is permitted to have a substantial amount of vibration-responsive motion relative to other parts of the machine.

Those skilled in the art will appreciate that the invention can be embodied in forms other than as herein disclosed for purposes of illustration.

The invention is defined by the following claims:

1. A tractor vehicle comprising a front set of wheels, a rear set of wheels, an engine by which the vehicle is propelled and which is mounted substantially over one of said sets of wheels, hitch means for attaching to the vehicle a work performing unit to be propelled thereby, and operator accommodating means enabling an operator to ride on the vehicle and control the same, said tractor vehicle being characterized by:
    A. first structure comprising
        1. a substantially rigid transversely extending member having the wheels of said one set so connected with its opposite ends as to partake of substantially all vibration thereof,
        2. a frame member upon which the engine is mounted with its crankshaft axis oriented substantially fore and aft of the vehicle,
        3. pivot means providing a connection between said frame member and the transversely extending member that is substantially rigid along and around a vertical axis and a horizontal axis transverse to said crankshaft axis, and which thus constrains said members to swinging motion relative to one another about a pivot axis parallel to that of the crankshaft while transmitting to said transversely extending member certain of the vibration forces generated by the engine, to be carried into the wheels of said one set, and
        4. damping means operatively associated with said pivot means for frictionally retarding relative swinging motion of said members about said pivot axis and thus substantially absorbing such of the vibration forces of the engine as tend to induce such swinging motion;
    B. second structure connecting the other set of wheels and said operator accommodating means; and
    C. a plurality of substantially resilient vibration isolators, each connected between said first structure and said second structure, said vibration isolators being disposed at spaced apart locations such as to cooperate in holding the two structures in generally fixed relation to one another but by their resilience permitting the first structure to make small excursions relative to the second structure in response to vibration forces imposed upon the first structure, thus substantially isolating the operator accommodating means from such forces.

2. The tractor vehicle of claim 1 wherein said vibration isolators are connected between said frame member and said second structure.

3. The tractor vehicle of claim 2, further characterized by:
    said hitch means having a fixed connection with said transversely extending member.

4. A tractor vehicle having a front pair of wheels, a rear pair of wheels, an engine for propelling the vehicle mounted over one of said pairs of wheels, and means for accommodating an operator who guides and controls the vehicle, said vehicle being characterized by:
    A. a first substantially rigid frame portion to which is attached the other pair of wheels and said means for accommodating the operator;
    B. a second substantially rigid frame portion;
    C. means rigidly attaching the engine to said second frame portion;
    D. a plurality of spaced apart substantially resilient vibration absorbing elements, each secured to both of said frame portions to connect the two frame portions in a manner that substantially isolates from the first frame portion vibration of the second frame portion;
    E. a substantially rigid axle member extending transversely to the vehicle and having its opposite ends connected with the wheels of said one pair thereof;
    F. means providing a pivotal connection between said second frame portion and said axle member whereby the axle member is confined to tilting motion relative to the second frame portion about an axis which extends substantially fore and aft of the vehicle and which is substantially midway between the wheels, such tilting of the axle member enabling the wheels to follow irregulator terrain and said pivotal connection also enabling the engine to make lateral vibratory excursions relative to the axle member and to the first frame portion; and
    G. damping means for frictionally retarding relative motion between the second frame portion and the axle member about the axis of said pivotal connection, to thus dissipate in friction a substantial part of the energy of such lateral vibratory excursions of the engine and minimize transmission to the first frame portion of the vibration forces responsive for such excursions.

5. The tractor vehicle of claim 4 having attachment means to which can be hitched a working unit to be propelled by the vehicle, further characterized by:
    said attachment means being connected to the axle member in fixed relation thereto and in substantially symmetrical relation to a vertical plane containing the axis of said pivotal connection so that the vibration absorbing elements and the damping means cooperate to minimize transmission to the first frame portion of vibration of a working unit hitched to the attachment means.

6. The tractor vehicle of claim 4, further characterized by:

G. the engine being mounted on the second frame portion in such orientation that the dominant vibration mode of the engine tends to move it in directions transverse to the axis of said pivotal connection, so that a substantial portion of the vibration of the engine is absorbed in friction by said damping means.

7. The tractor vehicle of claim 6 wherein the engine is mounted with the axis of its crankshaft oriented substantially lengthwise of the vehicle.

8. A tractor vehicle having a front set of wheels, a rear set of wheels, an engine by which the vehicle is propelled, hitch means for attaching to the vehicle a work performing unit to be propelled thereby, and operator accommodating means enabling an operator to ride on the vehicle and comprising instrumentalities by which the operator can control the vehicle, said vehicle being characterized by:
  A. a substantially rigid fore-and-aft extending main frame on which one of said sets of wheels and said operator accommodating means are mounted and the length of which is equal to a major portion of that of the vehicle;
  B. a substantially rigid subframe having a substantially shorter length than the main frame;
  C. means mounting the engine in rigidly fixed relation to the subframe with the engine crankshaft axis substantially parallel to the longitudinal centerline of the subframe;
  D. a plurality of resilient vibration absorbing elements connecting the subframe with the main frame, with the subframe disposed near the end portion of the main frame that is remote from said one set of wheels, said elements being disposed
    1. substantially symmetrically with respect to the longitudinal centerlines of the main frame and the subframe, and
    2. near opposite ends of the subframe, to connect the main frame and subframe in a manner that holds them in generally fixed relation to one another but permits the subframe to make small vibrations relative to the main frame in response to vibrations imposed upon the subframe;
  E. a substantially rigid transverse member having the wheels of the other set connected to its opposite ends;
  F. means providing a connection between the subframe and the transverse member whereby the latter is confined to tilting motion relative to the subframe about a pivot axis intermediate the ends of the transverse member and parallel to said longitudinal centerlines, so that vibration of the engine in most of its modes is transmitted substantially undiminished to the wheels of said other set, to be carried into the ground through them;
  G. damping means for frictionally retarding motion of the subframe relative to the transverse member about said pivot axis, to thus dissipate in friction a substantial part of the energy of lateral vibratory excursions of the engine; and
  H. the hitch means being rigidly secured to said transverse member at opposite sides of said axis.

9. The tractor vehicle of claim 8 wherein said one set of wheels comprises powered rear wheels of the vehicle, further characterized by:
  I. a drive shaft extending rearwardly from the engine crankshaft toward said rear wheels, for imparting torque to the rear wheels; and
  J. a substantially resilient, vibration isolating torque transmitting connection between the engine crankshaft and said drive shaft.

* * * * *